US012794088B2

(12) United States Patent
Kim et al.

(10) Patent No.: US 12,794,088 B2
(45) Date of Patent: Nov. 10, 2026

(54) ELECTRODE TAB WELDING APPARATUS INCLUDING TAB GUIDE AND ELECTRODE TAB WELDING METHOD USING THE SAME

(71) Applicant: LG Energy Solution, Ltd., Seoul (KR)

(72) Inventors: Sang Hun Kim, Daejeon (KR); Sung Hun Oh, Daejeon (KR); Jeong Jin Ban, Daejeon (KR); Tae Jong Kim, Daejeon (KR); Sun Il Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 771 days.

(21) Appl. No.: 18/019,324

(22) PCT Filed: Oct. 25, 2021

(86) PCT No.: PCT/KR2021/015021

§ 371 (c)(1),
(2) Date: Feb. 2, 2023

(87) PCT Pub. No.: WO2022/097977

PCT Pub. Date: May 12, 2022

(65) Prior Publication Data

US 2024/0128603 A1 Apr. 18, 2024

(30) Foreign Application Priority Data

Nov. 5, 2020 (KR) ........................ 10-2020-0146811

(51) Int. Cl.

*H01M 50/536* (2021.01)
*B23K 20/10* (2006.01)
(Continued)

(52) U.S. Cl.

CPC ........... *H01M 50/536* (2021.01); *B23K 20/10* (2013.01); *B23K 20/26* (2013.01); *H01M 50/105* (2021.01); *B23K 2101/36* (2018.08)

(58) Field of Classification Search

CPC ... H01M 50/536; H01M 50/105; H01M 50/20
See application file for complete search history.

(56) References Cited

U.S. PATENT DOCUMENTS 3,873,803 A * 3/1975 Young ................... H01M 50/50 219/121.11
10,259,068 B2 4/2019 Benoit et al.
(Continued)

FOREIGN PATENT DOCUMENTS

CN 104638223 A 5/2015
JP 2005116434 A 4/2005
(Continued)

OTHER PUBLICATIONS

Machine Translation of: KR 2020-0105272 A, Choi et al., Sep. 7, 2020.*
(Continued)

*Primary Examiner* — Kenneth J Douyette
(74) *Attorney, Agent, or Firm* — Lerner David LLP

(57) ABSTRACT

The present invention relates to an electrode tab welding apparatus for welding electrode tabs of a pouch-shaped battery to each other in a state of gathering the electrode tabs using tab guides in a preliminary welding step of welding the electrode tabs to each other before welding the electrode tabs and an electrode lead of the pouch-shaped battery to each other and an electrode tab welding method using the same.

20 Claims, 13 Drawing Sheets

(51) Int. Cl.

| | |
|---|---|
| ***B23K 20/26*** | (2006.01) |
| ***H01M 50/105*** | (2021.01) |
| *B23K 101/36* | (2006.01) |

(56) References Cited

U.S. PATENT DOCUMENTS

| | | | | |
|---|---|---|---|---|
| 2006/0088761 | A1* | 4/2006 | Ota | B60L 58/21 429/162 |
| 2011/0117399 | A1 | 5/2011 | Ahn et al. | |
| 2018/0301685 | A1* | 10/2018 | Jeon | H01M 10/058 |
| 2019/0148705 | A1 | 5/2019 | Park et al. | |

FOREIGN PATENT DOCUMENTS

| | | | |
|---|---|---|---|
| JP | 2019067569 | A | 4/2019 |
| JP | 2019-102215 | A | 6/2019 |
| JP | 2019207861 | A | 12/2019 |
| KR | 20030066172 | A | 8/2003 |
| KR | 101308296 | B1 | 9/2013 |
| KR | 101492726 | B1 | 2/2015 |
| KR | 20160007109 | A | 1/2016 |
| KR | 20170095067 | A | 8/2017 |
| KR | 20190054617 | A | 5/2019 |
| KR | 20190067312 | A | 6/2019 |
| KR | 102094210 | B1 | 3/2020 |
| KR | 20200105272 | A | 9/2020 |

OTHER PUBLICATIONS

International Search Report for PCT/KR2021/015021 mailed Jan. 26, 22. 3 pgs.

Extended European Search Report including Written Opinion for Application No. 21889442.6 dated May 14, 2024. 8 pgs.

* cited by examiner

ELECTRODE TAB WELDING APPARATUS INCLUDING TAB GUIDE AND ELECTRODE TAB WELDING METHOD USING THE SAME

CROSS-REFERENCE TO RELATED APPLICATIONS

This application is a national phase entry under 35 U.S.C. § 371 of International Application No. PCT/KR2021/015021, filed on Oct. 25, 2021, which claims the benefit of priority to Korean Patent Application No. 10-2020-0146811, filed on Nov. 5, 2020, the disclosure of which is incorporated herein by reference in its entirety.

TECHNICAL FIELD

The present invention relates to an electrode tab welding apparatus including a tab guide and an electrode tab welding method using the same. More particularly, the present invention relates to an electrode tab welding apparatus for welding electrode tabs of a pouch-shaped battery to each other in a state of gathering the electrode tabs using tab guides in a preliminary welding step of welding the electrode tabs to each other before welding the electrode tabs and an electrode lead of the pouch-shaped battery to each other and an electrode tab welding method using the same.

BACKGROUND ART

With diversification of devices that use batteries, demand for high-capacity, high-density batteries has increased. Among such batteries, the range of use of a lithium secondary battery, which has high energy density and discharge voltage, has gradually been widened.

Based on the external shape thereof, secondary batteries are classified into a cylindrical secondary battery, a prismatic secondary battery, and a pouch-shaped secondary battery. A secondary battery may have a structure in which an electrode assembly is received in any one of various shaped cases.

The electrode assembly may be (1) a jelly-roll type assembly, which is configured to have a structure in which a long sheet type positive electrode and a long sheet type negative electrode are wound in the state in which a separator is interposed therebetween, (2) a stacked type assembly including unit cells, each of which is configured to have a structure in which a rectangular positive electrode and a rectangular negative electrode are stacked in the state in which a separator is interposed therebetween, (3) a stacked and folded type assembly, which is configured to have a structure in which unit cells are wound using a long separation film, or (4) a laminated and stacked type assembly, which is configured to have a structure in which unit cells are stacked and attached to each other in the state in which a separator is interposed therebetween.

Thereamong, an electrode assembly configured to have a structure in which one or more positive electrodes and one or more negative electrodes are stacked, such as a stacked type assembly, a stacked and folded type assembly, or a laminated and stacked type assembly, has been utilized in various ranges for reasons that a ratio of capacity to density of the electrode assembly is high, the electrode assembly is easily manufactured, and the shape of the electrode assembly is easily changed.

In the stacked type electrode assembly, electrode tabs protruding from the electrode assembly are gathered and welded to an electrode lead, which is electrically connected to the outside.

As disclosed in the patent disclosure documents referenced herein, electrode tabs may be gathered and may be directly welded to an electrode lead. In this case, the electrode tabs, each of which has a smaller thickness than the electrode lead, may be cut. Since the number of electrodes that are stacked is increased in order to manufacture a high-capacity, high-density battery, whereby the number of electrode tabs is also increased, tensile force of the electrode tab located at the upper end and the tensile force of the electrode tab located at the lower end are different from each other, and therefore the electrode tabs may be more easily cut.

In order to solve this problem, preliminary welding of gathering only the electrode tabs and welding the electrode tabs in advance is performed, and then a step of welding the electrode tabs to the electrode lead is performed.

FIG. 1 is a schematic view of the section in which preliminary welding is performed by a conventional welding apparatus, and FIG. 4 shows an example of preliminary welding performed by the conventional welding apparatus. As shown in FIG. 1, the conventional welding apparatus gathers a plurality of electrode tabs 20 protruding from an electrode assembly 10 and performs preliminary welding. The electrode tabs are pressed and welded using a welding jig 50 constituted by a horn 30 and an anvil 40. In the drawings of the present application, the electrode assembly 10 is shown as a unit without individual illustration of a plurality of positive electrodes, a plurality of negative electrodes, and a plurality of separators, which are stacked. The electrode tabs 20 protrude from the plurality of positive electrodes or the plurality of negative electrodes, and the electrode tabs shown in the drawings may be negative electrode tabs or positive electrode tabs. The number of electrode tabs shown in the drawings is arbitrarily selected, and the present invention is not limited thereto.

The horn 30 and the anvil 40 apply high-frequency vibration generated by an ultrasonic wave of about 20 kHz, and such vibration energy is converted into thermal energy between the electrode tabs 20, whereby the electrode tabs are rapidly welded. Ultrasonic welding using vibration energy applies impact to the electrode tabs 20, whereby cutting between an electrode tab 20 and another electrode tab 20 may be caused or short circuiting of the electrode tabs may be caused. The reason for this is that tensile force is applied to the electrode tabs 20 during gathering of the plurality of electrode tabs 20 using the horn 30 and the anvil 40.

FIG. 2 is a schematic view illustrating stress that a pouch-shaped battery manufactured by the conventional welding apparatus may receive from a pouch-shaped battery case. Preliminary welding is performed using the method according to FIG. 1, and then the plurality of electrode tabs 20 is welded to an electrode lead 60. In the case in which the electrode assembly, manufactured as described above, is received in the pouch-shaped battery case 100 and then the case is hermetically sealed, external force P is applied to the electrode tabs 20 due to a curved shape of the side surface of the pouch-shaped battery case 100, and the electrode tabs 20 may be short-circuited due to such stress. In FIGS. 2 and 3, the electrode tabs 20 are shown as being drawn to the outer surface of the battery case 100 in order to show how much the electrode tabs welded in advance according to the conventional method are deformed by the battery case 100 and to show stress that the electrode tabs receive accordingly.

In FIGS. 2 and 3, actually, the electrode tabs 20 are deformed according to the shape of the battery case 100 and are disposed in the battery case 100. As a result, higher external force P and tensile force T are applied to electrode tabs disposed particularly at the outside.

Since the pouch-shaped battery case 100 must be shaped based on the shape of the electrode assembly 10, not the electrode tabs 20, and the volume of the pouch-shaped battery case must be reduced as much as possible, the electrode tabs must be deformed, whereby problems of external force and tensile force inevitably occur.

FIG. 3 is a schematic view illustrating stress that the pouch-shaped battery manufactured by the conventional welding apparatus may receive from an increase in thickness due to swelling. Preliminary welding is performed using the method according to FIG. 1, and then the plurality of electrode tabs 20 is welded to the electrode lead 60. The electrode assembly, manufactured as described above, is received in the pouch-shaped battery case 100 and then the case is hermetically sealed to manufacture a pouch-shaped battery. The thickness of the electrode assembly 10 is increased due to swelling of the battery caused as the result of charging and discharging. In this case, higher tensile force may be applied to the outermost electrode tabs extending from the electrode assembly 10, whereby a possibility of occurrence of short circuiting becomes very high.

Korean Patent Application Publication No. 2019-0054617 ("the '617 publication") relates to an electrode assembly, a secondary battery including the same, and a method of manufacturing the same, wherein an electrode stack, in which a plurality of electrodes and a plurality of separators are alternately disposed, and an electrode tab unit, constituted by a plurality of electrode tabs connected to the plurality of electrodes and extending to the side surface of the electrode stack, are included, the electrode tab unit includes an inclined portion provided at one side thereof and a tab gathering portion provided at the other side thereof, the inclined portion is configured to extend from the side surface of the electrode stack and to be bent in a direction in which the plurality of electrode tabs is gathered so as to form an inclination, the tab gathering portion is configured to extend from the inclined portion and to have a structure in which the electrode tabs are gathered, and the bending angle of electrode tabs located at the outermost sides, among the plurality of electrode tabs located at the inclined portion, is 0 degrees or less when measured based on a stack direction of the electrode stack.

The '617 publication mentions a structure in which the plurality of electrode tabs is pressed using a pressing unit and welding of a portion 132*b*, but does not consider the angle of the outermost tabs, the shape of a tab guide, and the radius of curvature of the tab guide, which are concretely considered in the present invention.

Korean Registered Patent Publication No. 1492726 ("the '726 publication") relates to a method and apparatus for joining metal sheets and a method and apparatus for joining battery electrode tabs using the same, wherein the metal sheets are sufficiently fused to each other through high-temperature pressing, whereby tensile strength is improved, and the metal sheets and a pressing unit are heated using an induction heating method, as a method of adhering the metal sheets in a larger stacked quantity than in the conventional art.

The '726 publication describes performing a step of pressing portions spaced apart from each other by a predetermined distance in a direction from a through-hole to an electrode unit before high-temperature pressing, but does not consider the angle of the outermost tabs, the shape of the tab guide, and the radius of curvature of the tab guide, which are concretely considered in the present invention.

Japanese Patent Application Publication No. 2019-67569 ("the '569 publication") relates to a laser welding apparatus, wherein the laser welding apparatus is capable of inhibiting sputter from being attached to the vicinity of a weld portion. The laser welding apparatus of the '569 publication includes a sputtering cover disposed outside a tab. The sputtering cover is a hollow box that allows air and laser to pass therethrough. The sputtering cover has an air flow path formed therein, a laser exit hole formed in a bottom plate, and a laser incidence hole formed in an upper plate. The laser welding apparatus includes an air supply device communicating with one end of the flow path of the sputtering cover. An air supply pipe of the air supply device is further ahead of the tab than the border between an active material layer and the tab, and is disposed between the section of the electrode assembly in the planar direction of the tab and the sputtering cover. The laser welding apparatus includes an intake device communicating with the other end of the flow path of the sputtering cover.

The '569 publication does not mention pressing of electrode tabs before welding, and is different in construction from the present invention in terms of the most important characteristics.

Korean Patent Application Publication No. 2019-0067312 ("the '312 publication") relates to a lithium secondary battery having a structure capable of preventing damage to connection between a tab weld portion and an electrode. The '312 publication discloses a lithium secondary battery configured such that at least two electrode assemblies, each of which includes a negative electrode layer formed on a negative electrode current collector, a positive electrode layer formed on a positive electrode current collector, and a separator formed between the negative electrode layer and the positive electrode layer, are stacked in parallel, characterized in that the lithium secondary battery includes a negative electrode tab weld portion, at which negative electrode tabs of the electrode assemblies are welded, and a positive electrode tab weld portion, at which positive electrode tabs of the electrode assemblies are welded, and a shock-absorbing portion configured to be operated depending on tension is provided at least one of the negative electrode tab and the positive electrode tab.

The '312 publication provides the electrode tab shock-absorbing portion, but the shape of the electrode tab is deformed to this end, and therefore the '312 publication is different in construction from the present invention.

In Korean Patent Application Publication No. 2016-0007109 ("the 109 publication") and Korean Patent Application Publication No. 2017-0095067 ("the '067 publication"), a connection portion between an electrode tab and an electrode lead is formed, and the position of a jig is adjusted when the connection portion is formed in a V shape, but cutting of the electrode tab is not prevented.

In Korean Patent Application Publication No. 2003-0066172 ("the 172 publication"), an electrode tab is pressed to change the shape of the electrode tab, as mentioned above, but a problem of damage to the electrode tab or cutting of the electrode tab is not recognized.

In the '067 publication, the electrode tab is pressed in advance using a blade 91. Conventional patent documents including the '067 publication relate to technology for directly welding a plurality of electrode tabs and an electrode lead to each other, as described above. When the plurality of electrode tabs and the electrode lead are directly welded to each other, short circuit of the electrode tabs, each of which has a smaller thickness than the electrode lead, occurs due to ultrasonic welding using vibration energy, as mentioned above. This problem is not easily solved even though the blade 91 is applied. All of the prior art documents suggest conceptually approached technical solutions; however, these solutions are not sufficient when actually applied.

Even in the case in which preliminary welding of only the electrode tabs is performed and the blade (tab guide) disclosed in the '067 publication is applied in order to prevent short circuit of the electrode tabs due to ultrasonic vibration, the problem is still not solved. Since vibration is generated even when preliminary welding is performed, short circuit of the electrode tabs occurs due to tensile force applied to the outermost electrode tabs. Even though the blade (tab guide) is applied to this end, many problems occur. The conventional patent documents and combinations thereof do not recognize problems with the angle of the outermost tabs, the shape of the tab guide, and the radius of curvature of the tab guide, which are recognized only through the present invention, and do not suggest any solution thereto.

As described above, the prior art documents try to improve technology related to welding of electrode tabs, but do not concretely recognize the problems suggested as described above, and do not suggest any solution thereto.

DISCLOSURE

Technical Problem

It is an object of the present invention to provide an electrode tab welding apparatus including a tab guide capable of solving a problem of electrode tab short circuit that occurs during welding of a plurality of electrode tabs and an electrode lead and an electrode tab welding method using the same.

Specifically, the present invention provides an apparatus capable of preliminarily welding a plurality of electrode tabs, and it is another object of the present invention to provide an electrode tab welding apparatus including a tab guide capable of preventing short circuit of electrode tabs that may occur during an assembly process, short circuit of the electrode tabs that may occur during a process of inserting an electrode assembly into a pouch-shaped case to manufacture a pouch-shaped battery, and short circuit of the electrode tabs that may occur due to swelling during use of the pouch-shaped battery and an electrode tab welding method using the same.

TECHNICAL SOLUTION

In order to accomplish the above objects, the present invention provides an electrode tab welding apparatus for preliminarily welding two or more electrode tabs protruding from an electrode assembly configured such that a positive electrode, a separator, and a negative electrode are stacked, the electrode tab welding apparatus including an upper tab guide and a lower tab guide configured to press the two or more electrode tabs in an upward-downward direction perpendicular to protruding surfaces of the two or more electrode tabs in order to gather the electrode tabs; and a welding unit configured to weld protruding portions of the two or more electrode tabs to each other, wherein the area of contact between the lower tab guide and the electrode tab is greater than the area of contact between the upper tab guide and the electrode tab.

The upper tab guide and the lower tab guide may be disposed between the outermost portion of the separator of the electrode assembly and the welding unit.

Corners that are facing the electrode assembly of portions of the upper tab guide and the lower tab guide that face the electrode tabs may be curved, and the radii of curvature of the curved corners may be 0.3 mm or more.

The radii of curvature of corners that are not facing the electrode assembly of the portions of the upper tab guide and the lower tab guide that face the electrode tabs may be 0.2 or more times the radii of curvature of the corners facing the electrode assembly.

The distance between the lower tab guide and the electrode assembly may be equal to or greater than the distance between the upper tab guide and the electrode assembly, then interval between the upper tab guide and the lower tab guide may be 3 mm or less, and each of the upper tab guide and the lower tab guide may haves a thickness of 0.5 mm or more.

When the electrode tabs are welded using the electrode tab welding apparatus, the internal angle between the outermost electrode tab of the electrode assembly and the vertical surface of the electrode assembly may be 45 degrees or less.

The electrode tab welding apparatus may further include a plate configured to support a lower end of the electrode assembly; and a pusher configured to push the electrode assembly an upper end of the electrode assembly in order to fix the electrode assembly, wherein the plate and the pusher may not protrude beyond the outermost side of the electrode assembly.

The welding unit may include a horn and an anvil.

Upper and lower positions of the upper tab guide and the lower tab guide may be adjusted such that corners of the horn and the anvil do not contact the electrode tabs.

In another aspect, the present invention provides a method of preliminarily welding two or more electrode tabs protruding from an electrode assembly configured such that a positive electrode, a separator, and a negative electrode are stacked using the electrode tab welding apparatus.

In a further aspect, the present invention provides a pouch-shaped battery including an electrode assembly welded using the electrode tab welding apparatus.

In addition, the present invention may provide all possible combinations of the above solving means.

Advantageous Effects

As is apparent from the above description, the present invention provides an electrode tab welding apparatus including a tab guide and an electrode tab welding method using the same, whereby the present invention has effects of preventing:

1) short circuiting of electrode tabs that may occur during an assembly process;
2) short circuiting of the electrode tabs that may occur during a process of inserting an electrode assembly into a pouch-shaped case to manufacture a pouch-shaped battery; and
3) short circuiting of the electrode tabs that may occur due to swelling during use of the pouch-shaped battery.

BEST MODE

In the present application, it should be understood that the terms “comprises,” “has,” “includes,” etc., when used in this specification, specify the presence of stated features, numbers, steps, operations, elements, components, or combinations thereof, but do not preclude the presence or addition of one or more other features, numbers, steps, operations, elements, components, or combinations thereof.

It will be understood that, when a component is referred to as being “connected to” or “coupled to” another component, it may be directly connected to or coupled to the other component, or intervening components may be present. In contrast, when a component is referred to as being “directly connected to” or “directly coupled to” another component, there are no intervening components present. Other terms that describe the relationship between components, such as “between” and “directly between” or “adjacent to” and “directly adjacent to”, must be interpreted in the same manner.

Unless otherwise defined, all terms, including technical and scientific terms, used in this specification have the same meanings as those commonly understood by a person having ordinary skill in the art to which the present invention pertains. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

Hereinafter, the present invention will be described with reference to the drawings.

Figure 5:
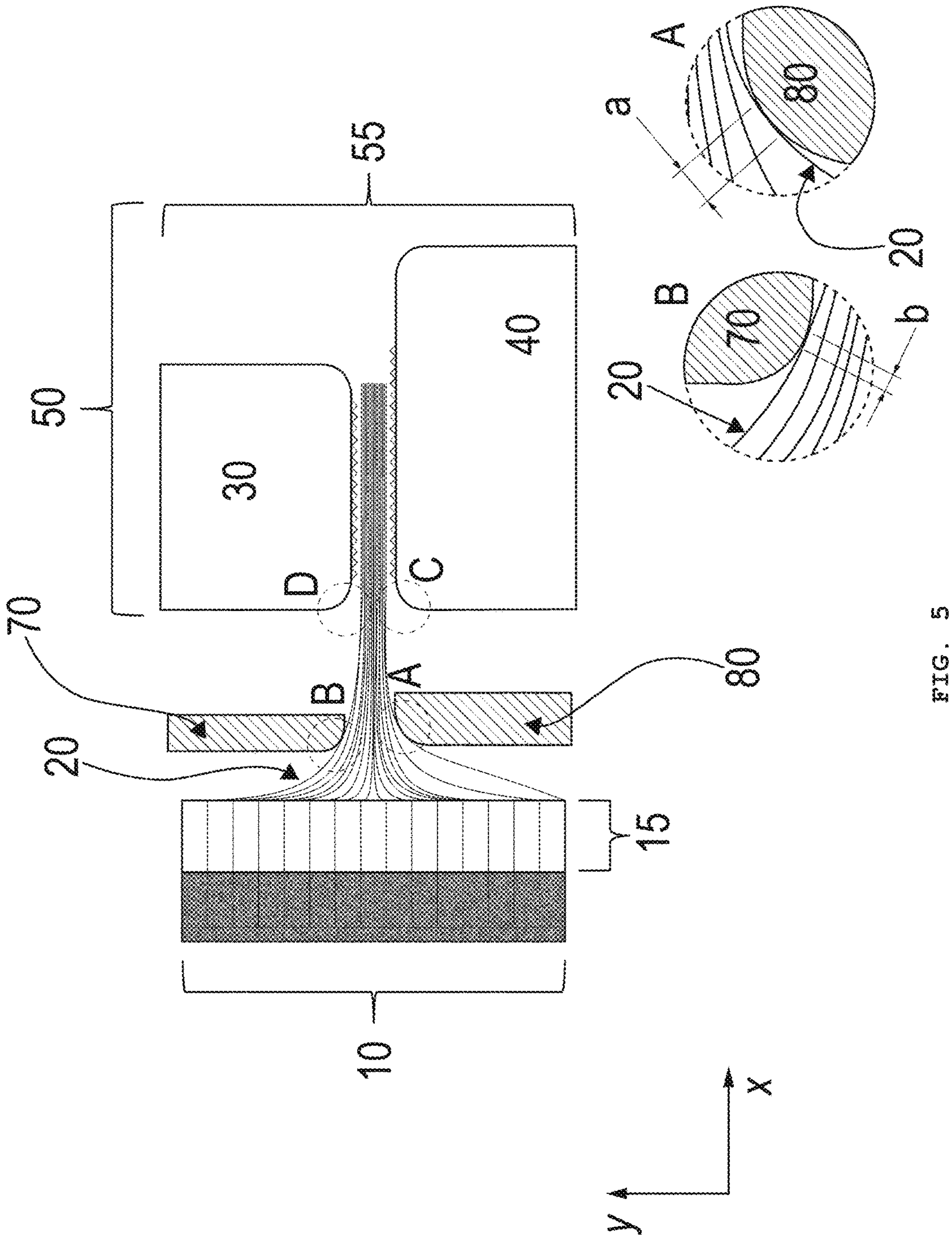
FIG. 5 is a schematic view of the section in which preliminary welding is performed by a welding apparatus according to an embodiment of the present invention.

FIG. 5 is a schematic view of the section in which preliminary welding is performed by a welding apparatus according to an embodiment of the present invention. The present invention provides an electrode tab welding apparatus, which is a welding apparatus for preliminarily welding two or more electrode tabs 20 protruding from an electrode assembly 10 configured such that a positive electrode, a separator, and a negative electrode are alternatingly stacked, including an upper tab guide 70 and a lower tab guide 80 configured to press the two or more electrode tabs 20 in an upward-downward direction perpendicular to protruding surfaces of the two or more electrode tabs 20 in order to gather the electrode tabs 20; and a welding unit 55 configured to weld protruding portions of the two or more electrode tabs 20 to each other, wherein the area of contact between the lower tab guide 80 and the electrode tab 20 is greater than the area of contact between the upper tab guide 70 and the electrode tab 20.

Figure 9:
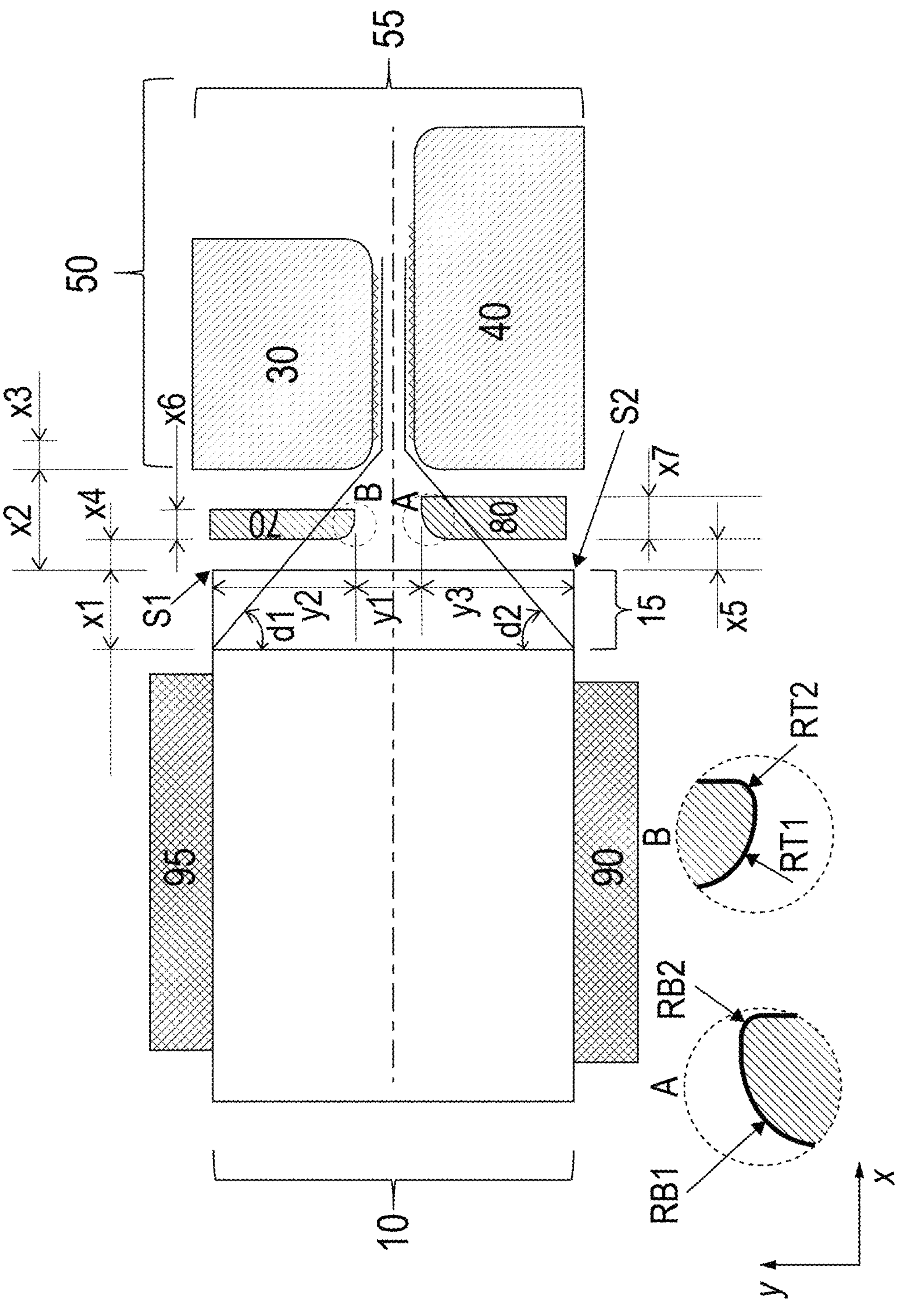
FIG. 9 is a schematic view showing variable values for analysis of stress of the welding apparatus according to the embodiment of the present invention.

The upper tab guide 70 and the lower tab guide 80 are disposed between the outermost portion of a separator 15 of the electrode assembly and the welding unit (zone x2 of FIG. 9). The electrode assembly 10 is configured such that a plurality of positive electrodes, a plurality of separators, and a plurality of negative electrodes are stacked. Current collectors of the positive electrodes or the negative electrodes protrude to constitute electrode tabs, and the separators also protrude over the positive electrodes and the negative electrodes in order to prevent short circuiting. In the case in which the electrode tabs are gathered to the middle thereof using the upper tab guide 70 and the lower tab guide 80 for preliminary welding, the separators may be damaged when the electrode tabs are deformed together with the separators. For this reason, the upper tab guide 70 and the lower tab guide 80 must be disposed between the outermost portions of the separators 15 of the electrode assembly and the welding unit.

When corners of a horn 30 and an anvil 40 come into contact with the electrode tabs 20, the portions of the electrode tabs that are not related to welding may be damaged due to vibration. Consequently, the upper and lower positions of the upper tab guide 70 and the lower tab guide 80 must be adjusted such that the corners of the horn 30 and the anvil 40 do not contact the electrode tabs 20. Referring to C and D of FIG. 5, it can be seen that the corners of the horn 30 and the anvil 40 do not contact the electrode tabs 20. As indicated by zone x3 of FIG. 9, the corners of the horn 30 and the anvil 40 do not contact the electrode tabs 20.

FIG. 5 shows only the periphery of the electrode assembly 10 from which the separators 15 and the electrode tabs 20 protrude. Referring to enlarged views A and B in FIG. 5, it can be seen that the length a of the section in which the lower tab guide 80 and the electrode tab 20 contact each other is greater than the length b of the section in which the upper tab guide 70 and the electrode tab 20 contact each other. The ’617 publication does not recognize this limitation, and those skilled in the art will configure the upper tab guide 70 and the lower tab guide 80 so as to have the same shape, since the electrode assembly is symmetrical in a vertical direction and the electrode tab 20 is also symmetrical in the vertical direction.

Even in the present invention, preliminary welding was performed using the upper tab guide 70 and the lower tab guide 80 manufactured so as to have the same shape. However, the electrode tabs were cut after an activation process before and after preliminary welding, and much research to solve this problem has been conducted. As a result, the inventors have found that, in the case in which the area of contact between the upper tab guide 70 and the electrode tab and the area of contact between the lower tab guide 80 and the electrode tab are different from each other, the above problem can be solved, and have derived the present invention. The present invention has been improved in order to reduce defects more and more depending on various conditions of the upper tab guide 70 and the lower tab guide 80 in consideration of the above, whereby the present invention has been completed.

Figure 6:
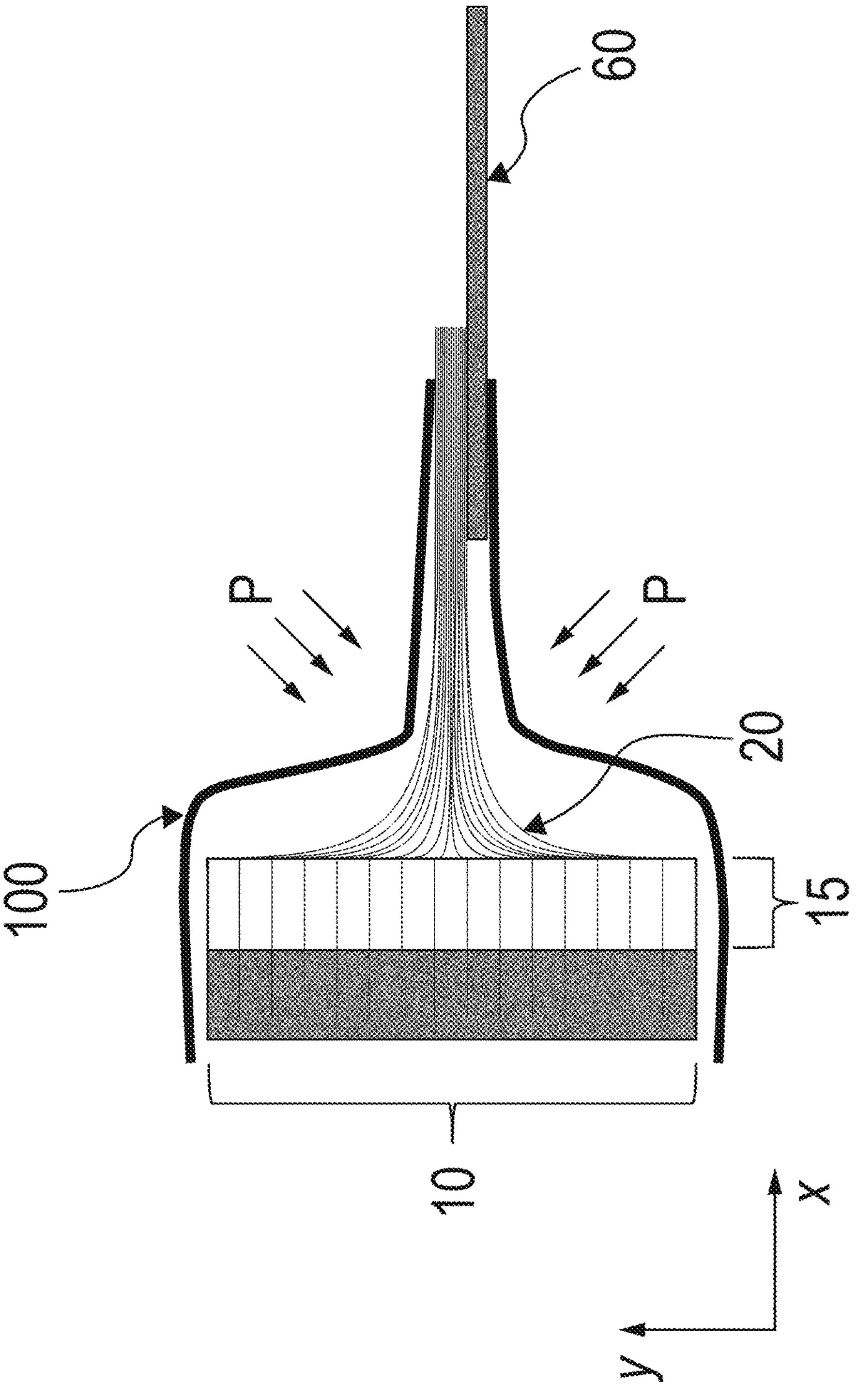
FIG. 6 is a schematic view illustrating relief of external force that a pouch-shaped battery manufactured by the welding apparatus according to the embodiment of the present invention may receive from a pouch-shaped battery case.
Figure 7:
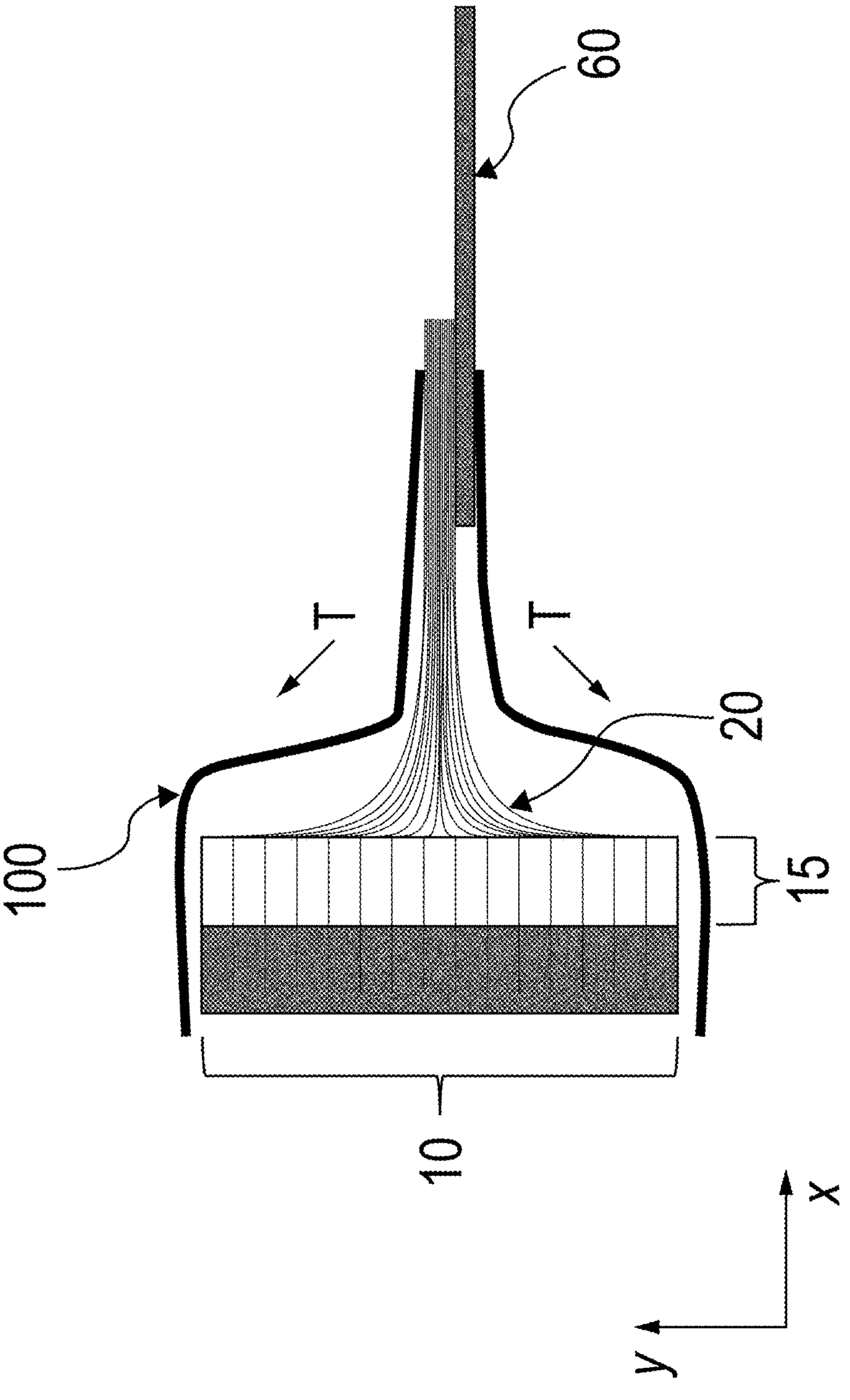
FIG. 7 is a schematic view illustrating relief of tensile force that the pouch-shaped battery manufactured by the welding apparatus according to the embodiment of the present invention may receive from an increase in thickness due to swelling.

FIG. 6 is a schematic view illustrating relief of external force that a pouch-shaped battery manufactured by the welding apparatus according to the embodiment of the present invention may receive from a pouch-shaped battery case, and FIG. 7 is a schematic view illustrating relief of tensile force that the pouch-shaped battery manufactured by the welding apparatus according to the embodiment of the present invention may receive from an increase in thickness due to swelling.

As can be seen from FIGS. 6 and 7, the outermost electrode tabs 20 of the electrode assembly according to the present invention have sufficient lengths, and therefore external force from the battery case is not directly applied to the electrode tabs, and tensile force due to swelling is not generated. Referring to analysis results of FIGS. 11 to 13, it has been analyzed that tensile force is not generated until the thickness of the electrode assembly is increased by 10% or more.

Figure 1:
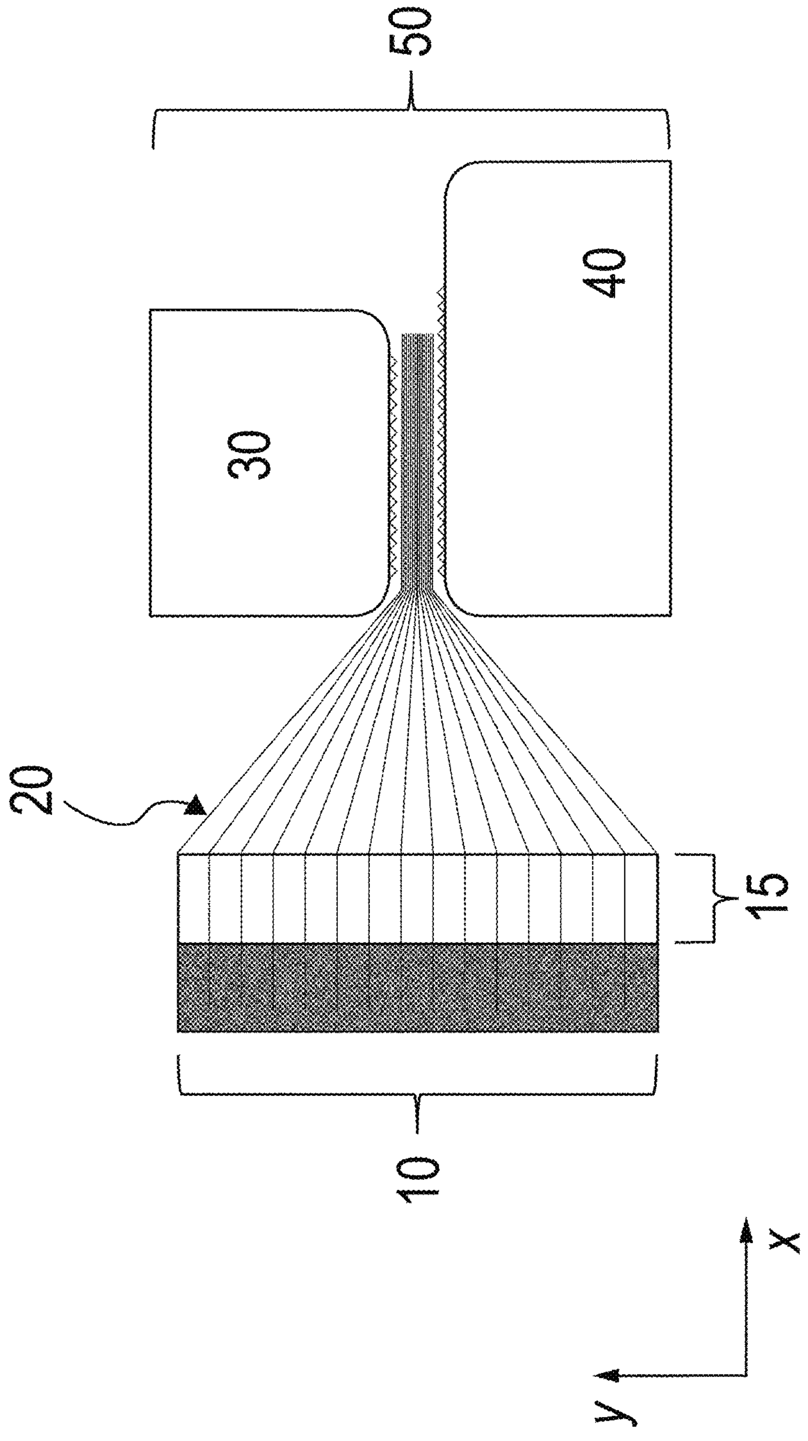
FIG. 1 is a schematic view of the section in which preliminary welding is performed by a conventional welding apparatus.
Figure 2:
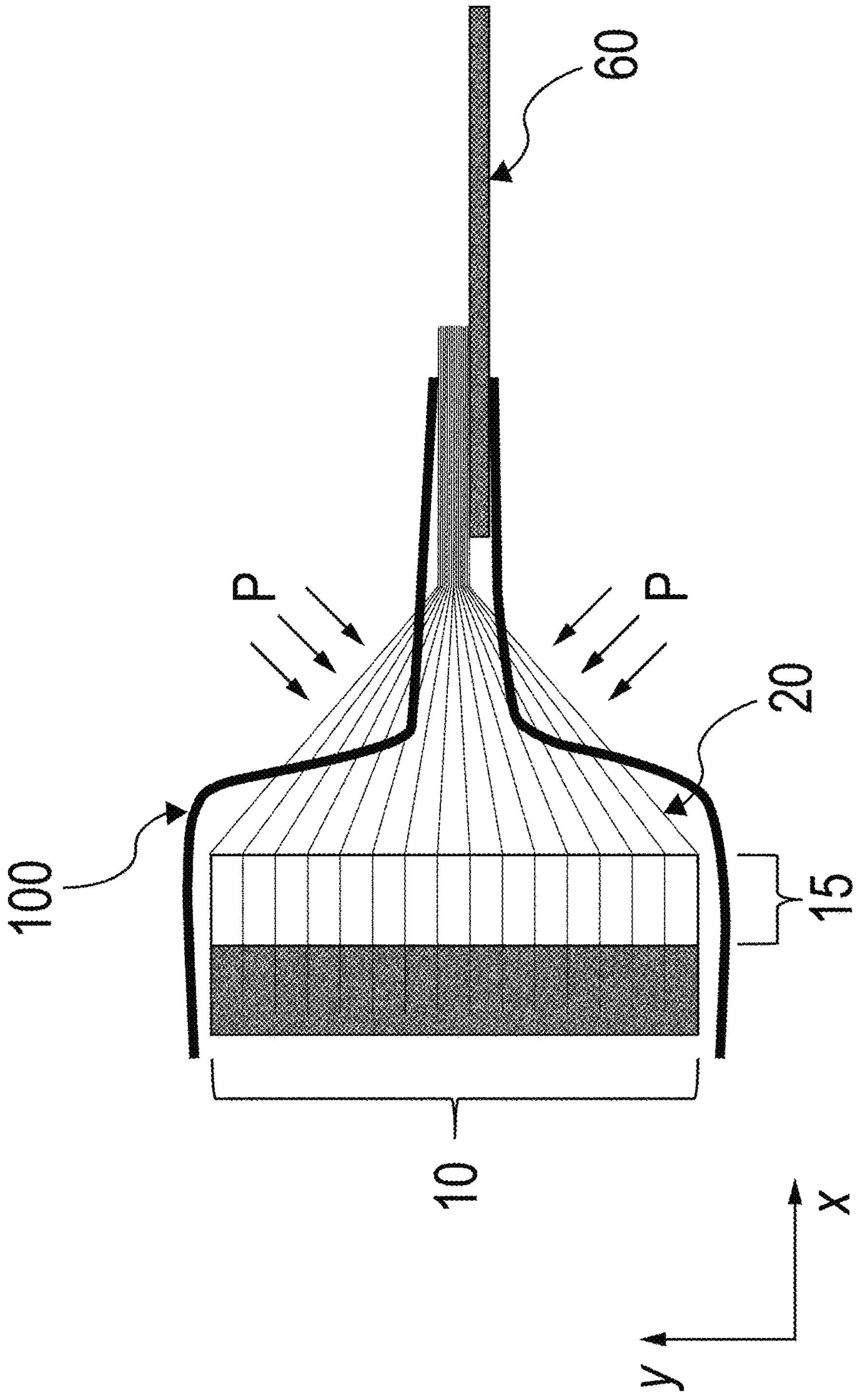
FIG. 2 is a schematic view illustrating external force that a pouch-shaped battery manufactured by the conventional welding apparatus may receive from a pouch-shaped battery case.
Figure 3:
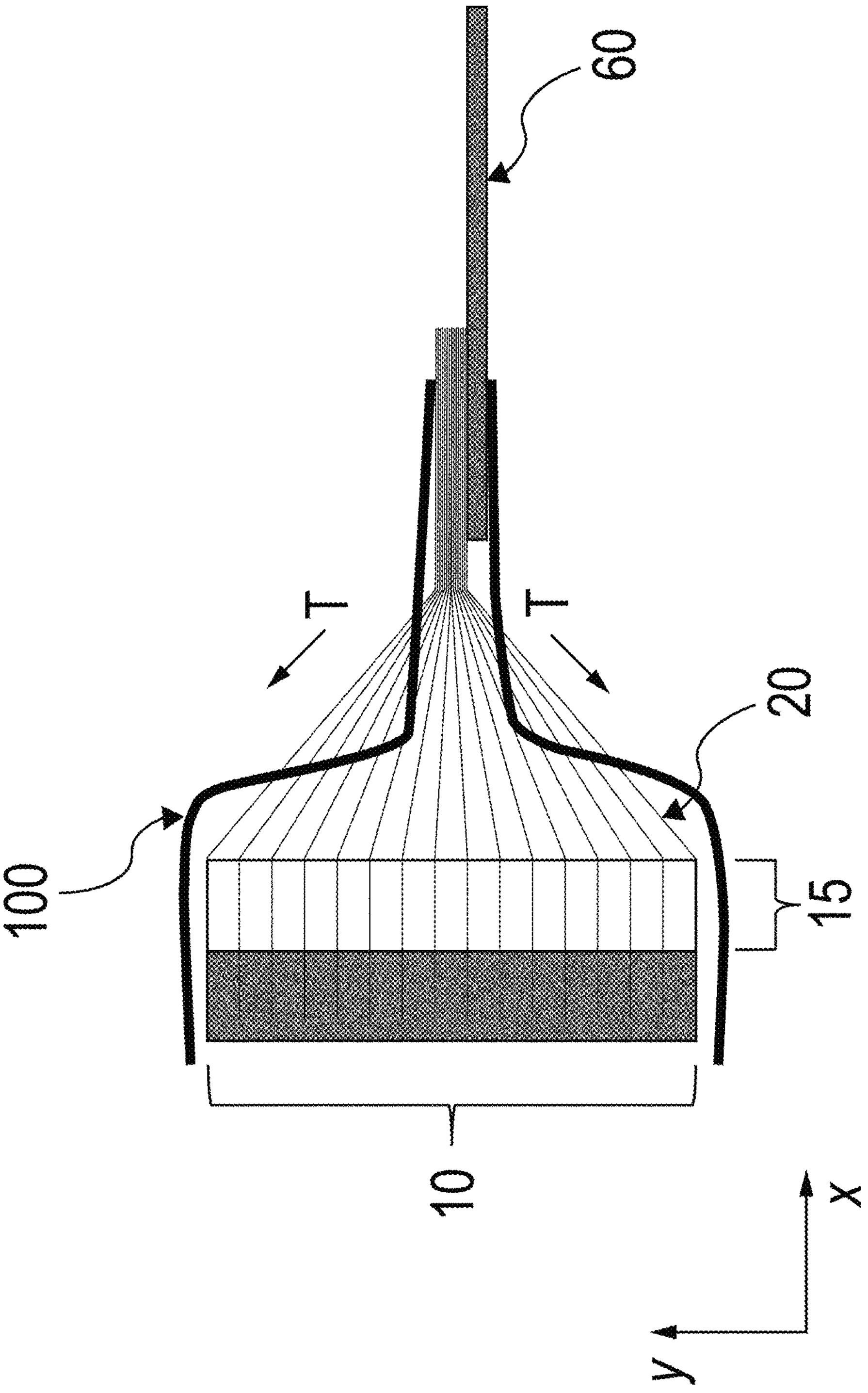
FIG. 3 is a schematic view illustrating tensile force that the pouch-shaped battery manufactured by the conventional welding apparatus may receive from an increase in thickness due to swelling.
Figure 4:
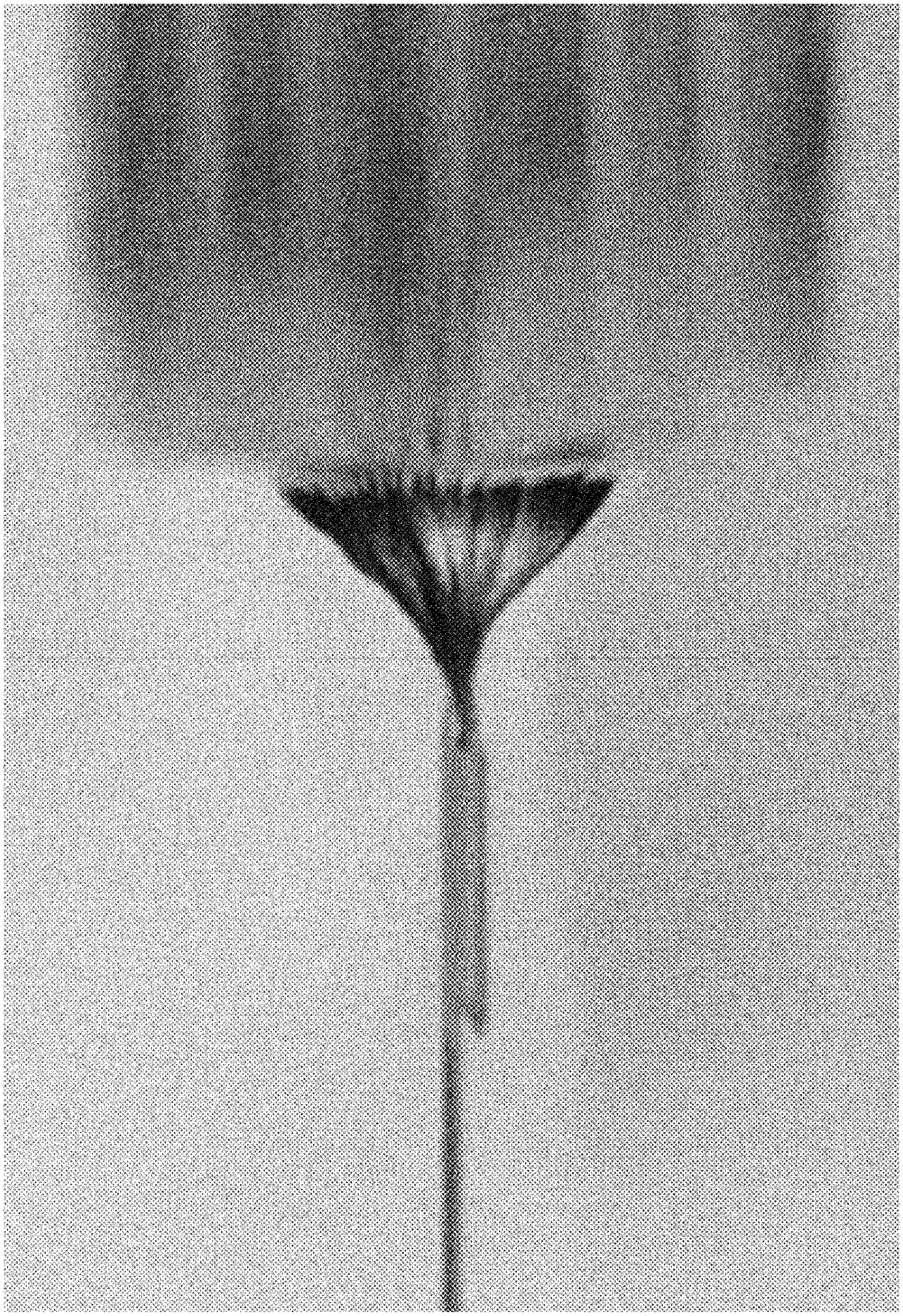
FIG. 4 shows an example of preliminary welding performed by the conventional welding apparatus.
Figure 8:
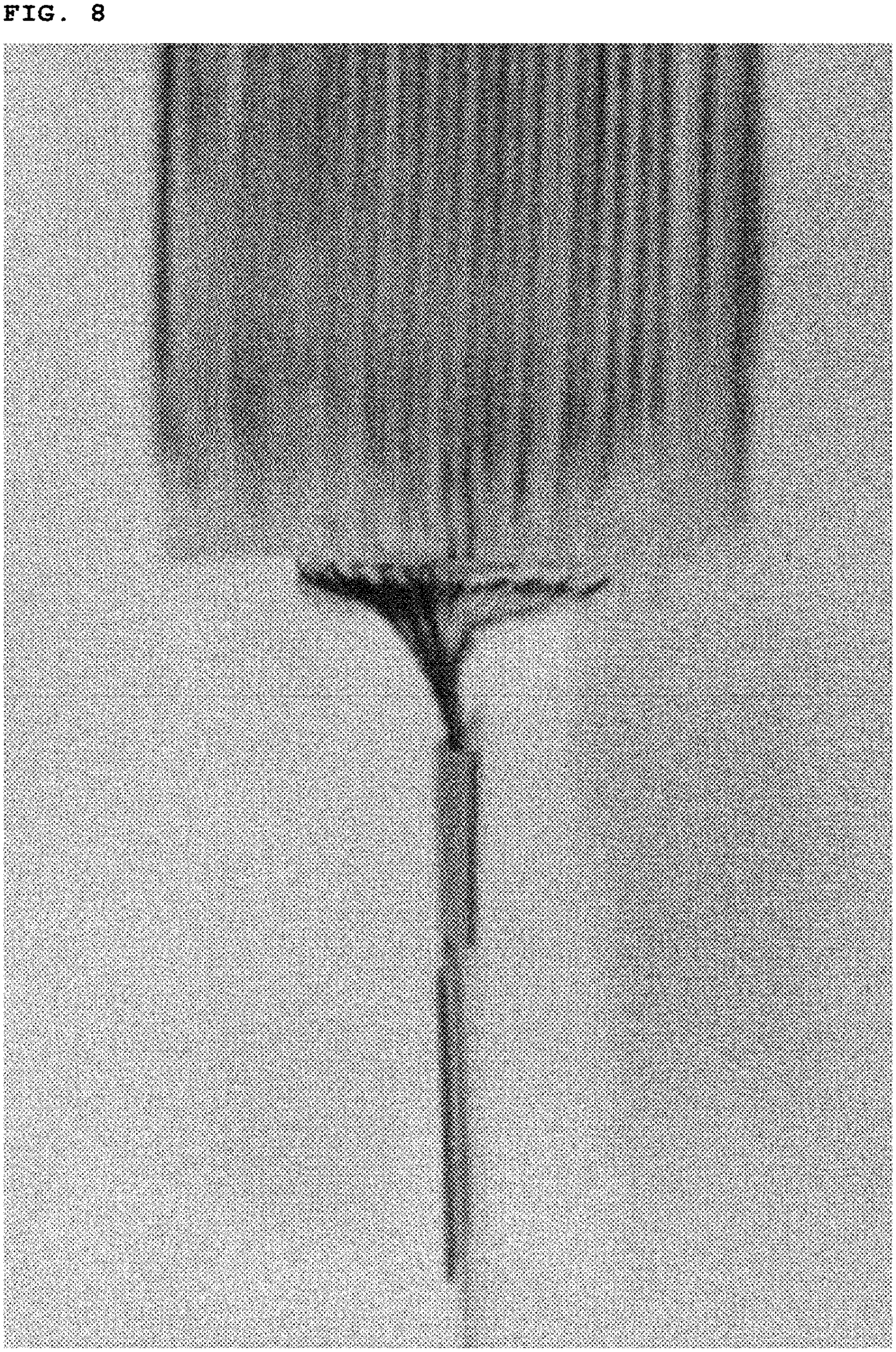
FIG. 8 shows an example of preliminary welding performed by the welding apparatus according to the embodiment of the present invention.

FIG. 8 shows an example of preliminary welding performed by the welding apparatus according to the embodiment of the present invention, from which it can be seen that tensile force is not applied even to the outermost electrode tabs, unlike FIG. 4.

Figure 10:
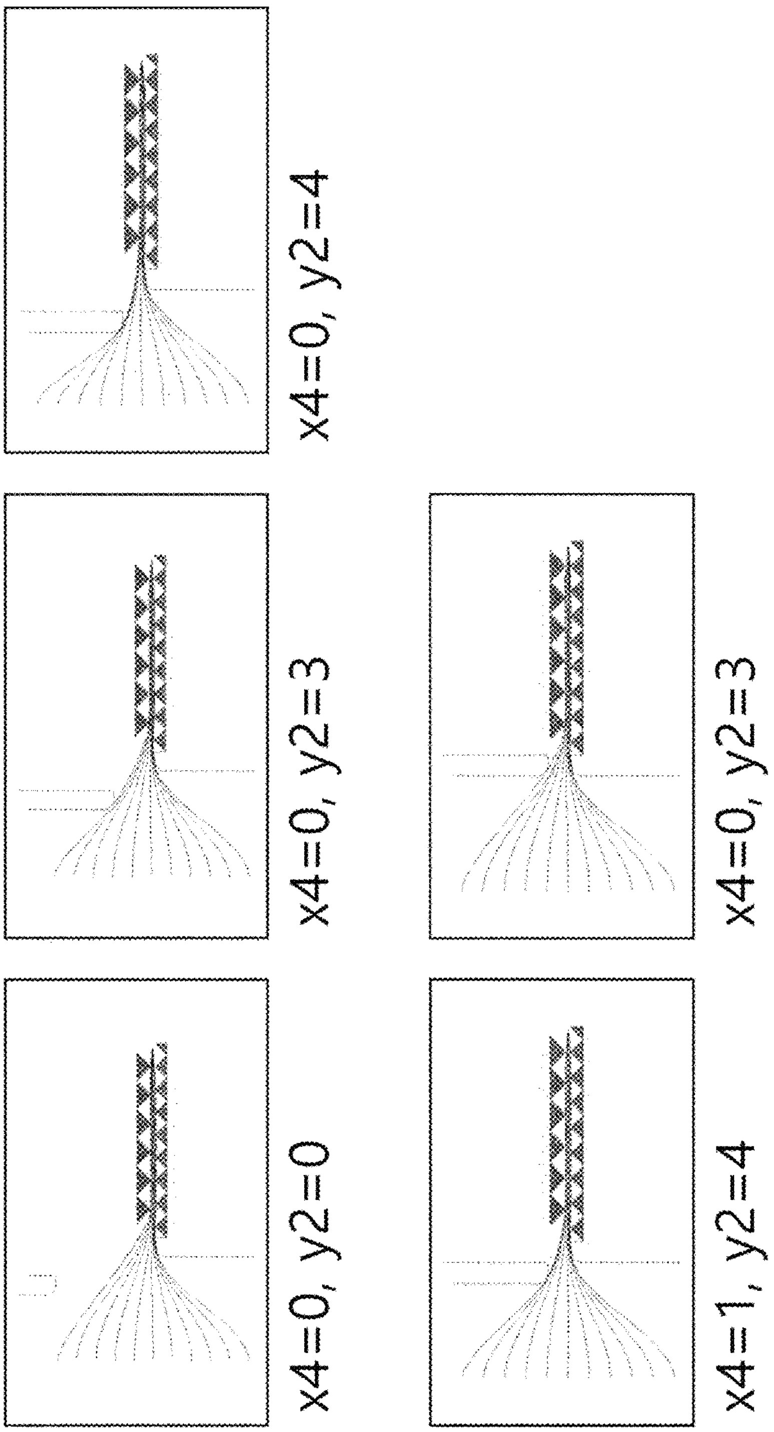
FIG. 10 is an illustration showing positions of an upper tab guide and a lower tab guide according to an embodiment of the present invention depending on variable values.

FIG. 9 is a schematic view showing variable values for analysis of stress of the welding apparatus according to the embodiment of the present invention, and FIG. 10 is an illustration showing positions of an upper tab guide and a lower tab guide according to an embodiment of the present invention depending on variable values.

FIG. 9 is a schematic view of a welding apparatus for preliminarily welding two or more electrode tabs 20 protruding from an electrode assembly 10 configured such that a positive electrode, a separator, and a negative electrode are stacked. A plate 90 configured to support the lower end of the electrode assembly 10 and a pusher 95 configured to push the electrode assembly 10 at the upper end of the electrode assembly 10 in order to fix the electrode assembly are further included. The plate 90 and the pusher 95 do not protrude beyond outermost sides of the electrode assembly. If the plate and the pusher protrude beyond the outermost side of the electrode assembly, the electrode tabs 20 may be damaged due to friction between the electrode tabs 20 that are vibrated and the plate and the pusher.

Referring to enlarged views A and B in FIG. 9, the corners that are facing the electrode assembly 10 of the portions of the upper tab guide 70 and the lower tab guide 80 that face the electrode tabs 20 are curved. It is preferable for the radii of curvature RT1 and RB1 of the curved corners to be 0.3 mm or more. If the radii of curvature are less than the above value, the electrode tab 20 may be damaged due to contact between the upper tab guide 70 and the electrode tab 20 and between the lower tab guide 80 and the electrode tab 20.

In addition, the radii of curvature RT2 and RB2 of the corners that are not facing the electrode assembly 10 of the portions of the upper tab guide 70 and the lower tab guide 80 that face the electrode tabs 20 may be 0.2 or more times the radii of curvature RT1 and RB1 of the curved corners facing the electrode assembly. Since the electrode tabs 20 mainly abut RT1 and RB1 but the final horizontal portions thereof abut RT2 and RB2, it is necessary f or the corners of these portions to have the above radii of curvature. If the radii of curvature RT2 and RB2 are less than the above value, the electrode tab 20 may be damaged due to contact between the upper tab guide 70 and the electrode tab 20 and between the lower tab guide 80 and the electrode tab 20.

In addition, the distance x5 between the lower tab guide 80 and the electrode assembly 10 is equal to or greater than the distance x4 between the upper tab guide 70 and the electrode assembly 10, the interval y1 between the upper tab guide 70 and the lower tab guide 80 is 3 mm or less, and each of the thickness x6 of the upper tab guide 70 and the thickness x7 of the lower tab guide 80 is 0.5 mm or more.

The distances from the upper tab guide 70 and the lower tab guide 80 or distances used for stress analysis below are based on S1 and S2, respectively. These are apexes of the separators protruding from the electrodes by x1. The x axis is the length from S1 or S2 to the first abutting portions of the upper tab guide 70 and the lower tab guide 80, and the y axis is the length from S1 or S2 to the distal ends A and B of the upper tab guide 70 and the lower tab guide 80. The numerical values used in coordinates are given in mm.

For example, in FIG. 9, the upper tab guide 70 is spaced from S1 by x4 in an x-axis direction and by y2 in a y-axis direction. The lower tab guide 80 is spaced from S2 by x5 in the x-axis direction and by y3 in the y-axis direction.

FIG. 10 is an illustration showing positions of the upper tab guide 70 and the lower tab guide 80 according to the embodiment of the present invention depending on variable values in such coordinates. Stress analysis for various cases was performed while changing coordinates based on such criteria.

Figure 11:
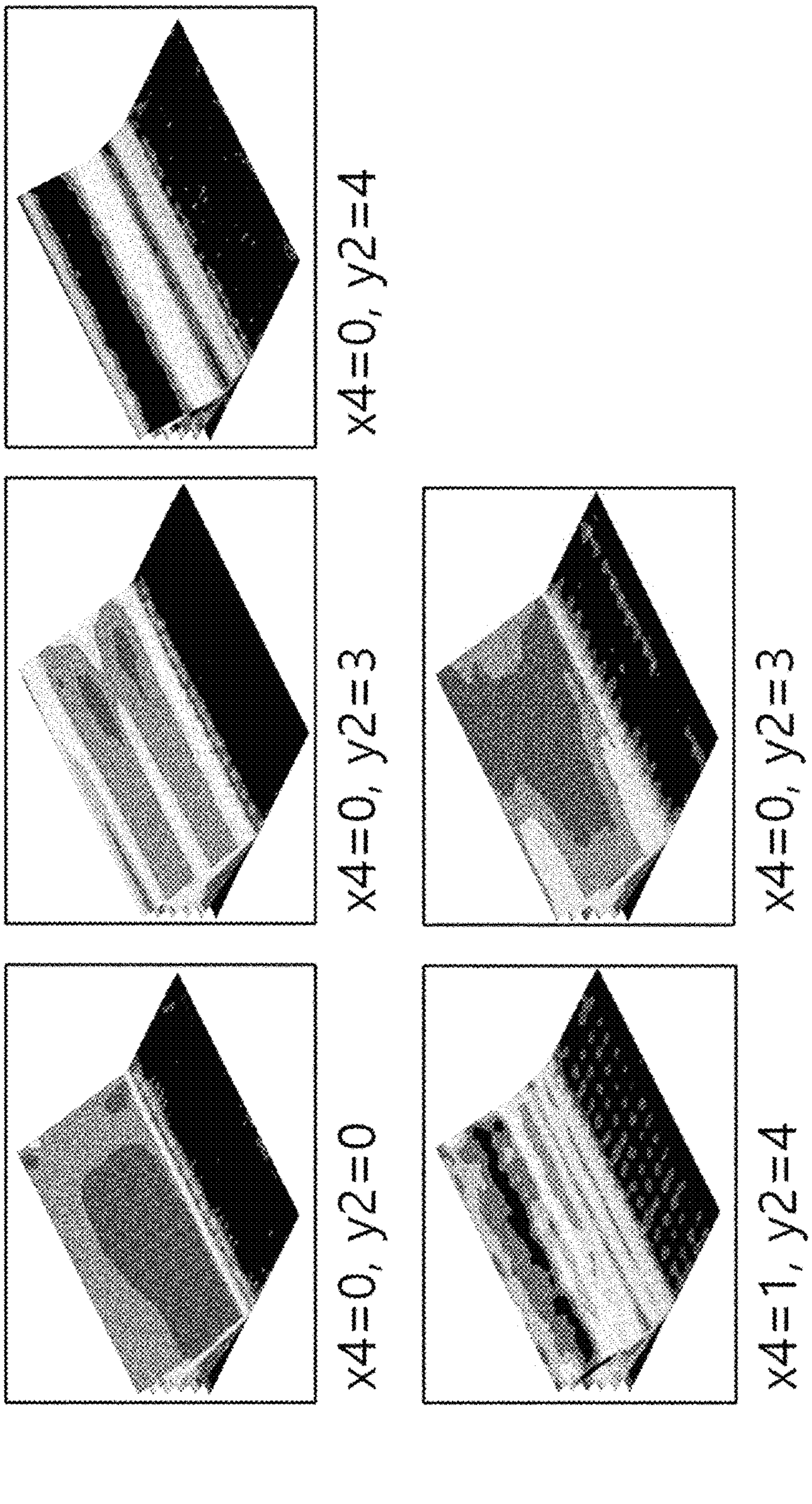
FIG. 11 shows the result of analysis of stress of the upper tab guide of the welding apparatus according to the embodiment of the present invention depending on the position thereof.
Figure 12:
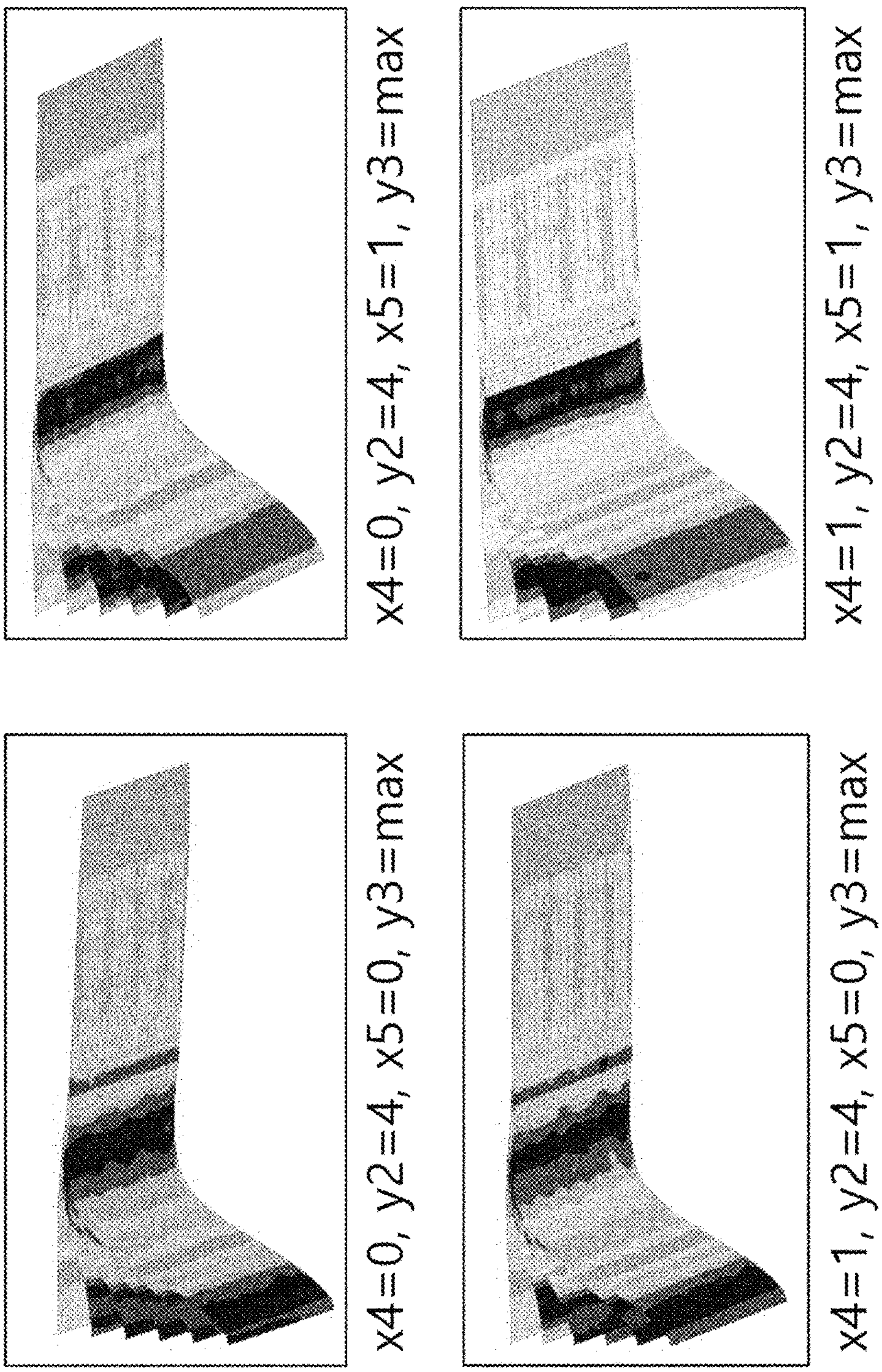
FIG. 12 shows the result of analysis of stress of the lower tab guide of the welding apparatus according to the embodiment of the present invention depending on the position thereof.
Figure 13:
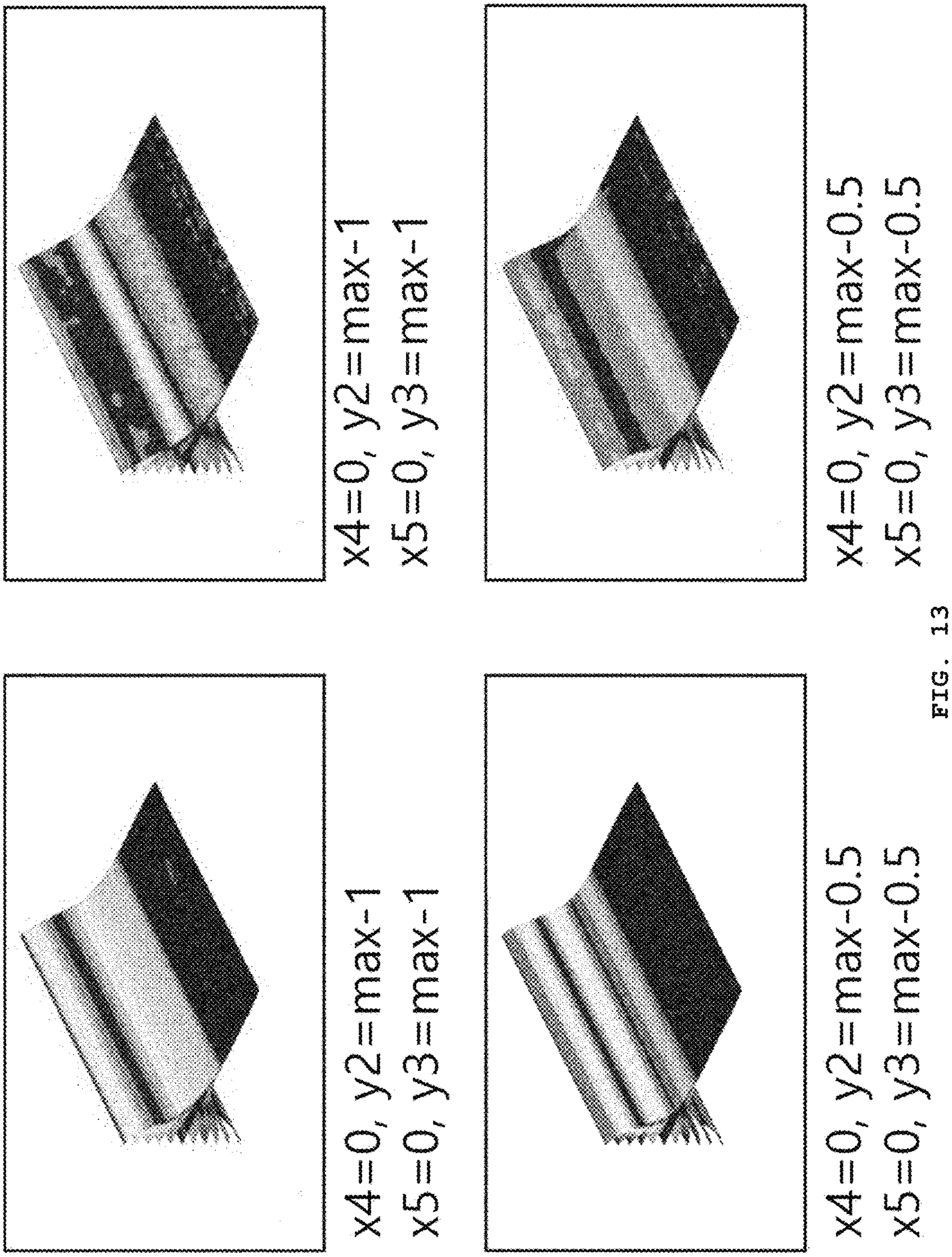
FIG. 13 shows the result of analysis of stress of the upper tab guide and the lower tab guide of the welding apparatus according to the embodiment of the present invention depending on the positions thereof.

FIG. 11 shows the result of analysis of stress of the upper tab guide of the welding apparatus according to the embodiment of the present invention depending on the position thereof, which is the result when a swelling phenomenon occurs. FIG. 12 shows the result of analysis of stress of the lower tab guide of the welding apparatus according to the embodiment of the present invention depending on the position thereof, which is the result when a swelling phenomenon occurs. FIG. 13 shows the result of analysis of stress of the upper tab guide and the lower tab guide of the welding apparatus according to the embodiment of the present invention depending on the positions thereof, wherein the left graph shows the result of stress before preliminary welding, and the right graph shows the result when a swelling phenomenon occurs.

In FIGS. 12 and 13, when the y value is max, indicates the distance that the tab guide moves until coming into contact with the electrode tab. Accordingly, max-1 means that the tab guide is spaced by 1 mm from the point at which the tab guide is in contact with the electrode tab.

Although higher stress may be exhibited for preliminary welding, it appears to be advantageous when the tab guides are disposed near the central portion and the electrode assembly in the case in which the electrode assembly is finally received in the battery case and an activation process is performed. Numerical values concretely defined in the present invention are derived through stress analysis and experimentation under such various conditions. In particular, the asymmetrical positions and structures of the upper tab guide 70 and the lower tab guide 80 were not recognized and predicted by those skilled in the art.

When the electrode tabs 20 are preliminarily welded using the electrode tab welding apparatus according to the present invention, the internal angle dl between the outermost electrode tab of the electrode assembly 10 and the vertical surface of the electrode assembly is 45 degrees or less. If the internal angle is greater than the above value, i.e. if the bending angle dl of the electrode tab and the electrode assembly is greater than 45 degrees, an electrode tab defect rate was rapidly increased when the battery swelled.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE SYMBOLS

10: Electrode assembly
15: Protruding separator
20: Electrode tab
30: Horn
40: Anvil
50: Welding jig
55: Welding unit
60: Electrode lead
70: Upper tab guide
80: Lower tab guide
90: Plate
95: Pusher
100: Pouch-shaped battery case
A, B: Enlarged views
C, D: Corners of horn and anvil
a: Surface at which lower tab guide and electrode tab abut each other
b: Surface at which upper tab guide and electrode tab abut each other
P: External force
T: Tensile force applied to electrode tab

INDUSTRIAL APPLICABILITY

The present invention relates to an electrode tab welding apparatus for welding electrode tabs of a pouch-shaped battery to each other in a state of gathering the electrode tabs using tab guides in a preliminary welding step of welding the electrode tabs to each other before welding the electrode tabs and an electrode lead of the pouch-shaped battery to each other and an electrode tab welding method using the same, and therefore the present invention has industrial applicability.

The invention claimed is:

1. An electrode tab welding apparatus for welding two or more electrode tabs protruding from an electrode assembly, the electrode tab welding apparatus comprising:

a first tab guide and a second tab guide configured to press two or more electrode tabs in a first direction perpendicular to protruding surfaces of the two or more electrode tabs; and a welding unit configured to weld protruding portions of the two or more electrode tabs to each other, wherein a second area of contact between the second tab guide and one of the electrode tabs is greater than a first area of contact between the first tab guide and one of the electrode tabs, and wherein the first area of contact includes a first curved portion and the second area of contact includes a second curved portion and a radius of curvature of the first curved portion is different from a radius of curvature of the second curved portion.

2. The electrode tab welding apparatus according to claim 1, wherein the first tab guide and the second tab guide are disposed between an outermost portion of a separator disposed between a positive electrode and a negative electrode of the electrode assembly and the welding unit.

3. The electrode tab welding apparatus according to claim 1, wherein first corners that are facing the electrode assembly of portions of the first tab guide and the second tab guide that face the electrode tabs include the first curved and the second curved portions.

4. The electrode tab welding apparatus according to claim 3, wherein radii of curvature of the first corners are approximately 0.3 mm or more.

5. The electrode tab welding apparatus according to claim 4, wherein radii of curvature of second corners that are not facing the electrode assembly of the portions of the first tab guide and the second tab guide that face the electrode tabs are approximately 0.2 or more times the radii of curvature of the first corners.

6. The electrode tab welding apparatus according to claim 1, wherein a distance between the second tab guide and the electrode assembly is equal to or greater than a distance between the first tab guide and the electrode assembly.

7. The electrode tab welding apparatus according to claim 1, wherein a space between the first tab guide and the second tab guide is approximately 3 mm or less.

8. The electrode tab welding apparatus according to claim 1, wherein each of the first tab guide and the second tab guide has a thickness of approximately 0.5 mm or more.

9. The electrode tab welding apparatus according to claim 1, wherein, when the electrode tabs are welded using the electrode tab welding apparatus, an internal angle between an outermost electrode tab of the electrode assembly and a vertical surface of the electrode assembly is approximately 45 degrees or less.

10. The electrode tab welding apparatus according to claim 1, further comprising:

a plate configured to support a first end of the electrode assembly; and a pusher configured to push the electrode assembly at a second end of the electrode assembly to fix the electrode assembly, wherein the plate and the pusher do not protrude beyond an outermost side of the electrode assembly.

11. The electrode tab welding apparatus according to claim 1, wherein the welding unit is a welding jig comprising a horn and an anvil.

12. The electrode tab welding apparatus according to claim 11, wherein first and second positions of the first tab guide and the second tab guide, respectively, are positioned such that corners of the horn and the anvil do not contact the electrode tabs.

13. The electrode tab welding apparatus according to claim 10, wherein the first end and the second end are opposite each other.

14. The electrode tab welding apparatus according to claim 1, wherein the first tab guide is opposite the second tab guide relative to the two or more electrode tabs.

15. The electrode tab welding apparatus according to claim 1, wherein first tab guide and the second tab guide are disposed asymmetrically about the two or more electrode tabs.

16. A method of preliminarily welding two or more electrode tabs protruding from an electrode assembly configured such that a positive electrode, a separator, and a negative electrode are stacked, the method comprising:

gathering the two or more electrode tabs with the electrode tab welding apparatus according to claim 1.

17. A pouch-shaped battery comprising an electrode assembly welded using the electrode tab welding apparatus according to claim 1.

18. The pouch-shaped battery according to claim 17, wherein outer electrode tabs of the two or more electrode tabs have a length such that an external force from a battery case is not directly applied to the outer electrode tabs.

19. An electrode tab welding apparatus for welding two or more electrode tabs protruding from an electrode assembly, the electrode tab welding apparatus comprising:

a first tab guide and a second tab guide configured to press two or more electrode tabs in a first direction perpendicular to protruding surfaces of the two or more electrode tabs, wherein a second area of contact between the second tab guide and one of the electrode tabs is greater than a a first area of contact between the first tab guide and one of the electrode tabs, and wherein the first area of contact includes a first curved portion and the second area of contact includes a second curved portion and a radius of curvature of the first curved portion is different from a radius of curvature of the second curved portion.

20. An electrode tab welding apparatus for welding two or more electrode tabs protruding from an electrode assembly, the electrode tab welding apparatus comprising:

an upper tab guide defining a first thickness and a rounded corner having a first radius of curvature configured to contact one of the two or more electrode tabs, and a lower tab guide defining a second thickness and a second rounded corner having a second radius of curvature configured to contact one of the two or more electrode tabs, wherein the first thickness is different from the second thickness and the first radius of curvature is different from the second radius of curvature.

* * * * *